3,744,982
METHOD OF MAKING BORON-ALLOYED DIAMOND COMPACTS AND BERYLLIUM-ALLOYED CUBIC BORON NITRIDE COMPACTS

Harold P. Bovenkerk, Worthington, Ohio, and Glenn T. Malloy, Andover, Mass., assignors to General Electric Company
No Drawing. Filed May 20, 1971, Ser. No. 145,517
Int. Cl. B24d 3/02
U.S. Cl. 51—307
3 Claims

ABSTRACT OF THE DISCLOSURE

Diamond compact and cubic boron nitride compact, and mixtures thereof, having electrical resistivity of less than 10 ohm-cm. are formed my mixing finely divided boron-alloyed synthetic diamond or cubic boron nitride, or mixtures thereof, with one-half to twenty overall weight percent of titanium diboride powder or zirconium diboride powder, or mixtures thereof, and subjecting the mixture to a temperature of at least 1300° C. in the cubic-stable region of appropriate hexagonal-cubic phase diagram.

BACKGROUND OF THE INVENTION

This invention relates to polycrystalline compacts having low electrical resistivity and to a process for preparing such compacts.

Natural diamonds are normally non-conductive but there have been a few exceptions identified by the fact that they have a characteristic blue color. With the advent of synthetic diamonds such as those made in accordance with Hall et al. U.S. Pat. 2,947,610 efforts were made to produce synthetic diamonds having controlled electrical conductivity. Wentorf et al. U.S. Pat. 3,148,161 discloses the production of electrically conducting diamonds by applying the process of Hall et al. in the presence of activator materials such as boron carbide, boron oxide, boron nitride, etc. As pointed out in column 12, lines 3–5, the process of Wentorf et al. produced diamonds having resistivities as low as $10^3$ ohm-cm. Wentorf U.S. Pat. 3,078,232 discloses the production of electrically conducting cubic boron nitride (hereinafter called CBN) by the addition of beryllium.

For many years much research effort has been directed to the preparation of diamond aggregates commonly referred to as "polycrystalline compacts." As used herein the terms "compact(s)" and "polycrystalline compact(s)" comprise aggregates formed from finely divided material bonded cohesively and having a density of at least 90% of the theoretical density of the mixture and preferably greater than 95% of the theoretical density. The starting material is finely divided diamond or CBN, sometimes referred to as "fines," the particles of which are smaller than 100 microns in diameter and are usually smaller than 40 microns in diameter. Such material is relatively low in cost and limited as to use in view of its very small size. If such material can be formed into strong polycrystalline compact it can compete with large single crystal diamonds in the abrasives market.

One way proposed for the conversion of fines to polycrystalline compact is to subject the fines to conditions of temperatures and pressure such that the hexagonal crystalline form of the material would be transformed to the cubic form. Such a process may be carried out in the presence of a bonding material such as the boron carbide of Bovenkerk et al. U.S. Pat. 3,136,615.

SUMMARY OF THE INVENTION

It has now been discovered that polycrystalline compacts of diamond and CBN possessing such low electrical resistivity as to be usable for electrical contacts may be formed by subjecting boron-alloyed diamond fines or beryllium-alloyed BN fines intermixed with titanium diboride powder or zirconium diboride powder to conditions of temperature and pressures such that the hexagonal crystalline form of the starting material would be transformed to the cubic form. The pressure used for this purpose is somewhat in excess of 40,000 atmospheres and the temperature somewhat in excess of 1300° C. The temperature and pressure conditions are correlated to the hexagonal-cubic phase diagram to insure that production of the compact takes place under cubic-stable conditions.

DESCRIPTION OF THE PREFERRED EMBODIMENT

The starting materials of this invention are boron-alloyed finely divided diamonds or beryllium-alloyed finely divided CBN. While they may be made in accordance with the method of Wentorf et al. U.S. Pat. 3,148,161 or Wentorf U. S. Pat. 3,078,232, it is understood that they are not limited to these methods. Any means for achieving the alloying will be satisfactory. It is, however, desirable that the lowest possible electrical resistivity be produced by the alloying as low resistivities produce a final compact which has a lower resistivity than would otherwise be the case, or would be desired for semiconducting applications. It is also desirable that the starting diamond material be subjected to a rigorous cleaning step such as acid treatment, ion bombardment by electrical discharge cleaning, ultrasonic cleaning, high temperature vacuum degassing, and combinations thereof, in order to produce a final compact possessing maximum cohesion.

The alloyed material is mixed with titanium or zirconium diboride powder until the mixture contains one-half to twenty weight percent of diboride. Excellent results are achieved if diboride is present to the extent of about one percent by weight and this is a preferred proportion. Higher proportions of diboride will sometimes produce compact having lower electrical resistivity but the lower resistivity does not bear a straight line proportionality to the percent of diboride which is present. The mixture is subjected to a sintering step carried out at pressures in excess of 50 kilobars—preferably about 65 to 100 kilobars—and temperatures in excess of 1300° C.—preferably about 1800° C. or higher—for periods of time ranging from about 10 to 30 minutes. A suitable apparatus for carrying out the sintering operation is disclosed in Hall U.S. Pat. 2,941,248 which is included by reference herein. Preferably, the sintering operation is performed in an inert container or one in which a reducing atmosphere is present during the sintering.

Pressures which should be used in preparing the compacts of the invention are based upon a calibration procedure which is related to known electrical resistance changes of various metals at room temperature under known pressures as described and illustrated in the aforementioned U.S. Patent 2,941,248 and as modified by correcting the calibration as described in "Calibration Techniques in Ultra-High Pressure Apparatus," F. P. Bundy, Journal of Engineering for Industry, May 1961, transactions of the ASME, Series B.

The temperature and pressure conditions for sintering have been described herein as conditions such that the hexagonal form of the starting material would, if present, be transformed into the cubic form. These conditions are now well known and understood. Another way of describing the conditions is to say that the mixture will be subjected to a temperature of at least 1300° C. in the cubic-stable region of the cubic-hexagonal pressure-temperature phase diagram. For a sintering temperature of 1300° C. this requires a pressure in excess of 50 kilobars.

For a sintering temperature of 1500° to 1800° C. the pressure must be at least 65 to 70 kilobars.

Compacts made in accordance with this invention have an electrical resistivity of less than 10 ohm-cm. and usually of the order of 1-2 ohm-cm. This enables these compacts to be used for such purposes as contacts for relays and contacts for high speed, mechanical switching of high current densities. In addition to possessing a low electrical resistivity, these compacts have a high resistance to abrasion from mating contacts. In addition, they have a low coefficient of friction and little or no chemical affinity for mating contacts under operating conditions. These characteristics enable these compacts to be used as commutator brushes in direct current and universal type electric motors.

While the invention has been described with reference to certain specific embodiments and applications, it is understood that the invention is limited in scope only as may be necessitated by the scope of the appended claims.

What we claim as new and desire to secure by Letters Patent of the United States is:

1. The method of making a compact having a density in excess of 90% of the theoretical density and an electrical resistivity of less than 10 ohm-cm. which comprises mixing material selected from the group consisting of synthetic boron-alloyed diamond fines, beryllium-alloyed cubic boran nitride fines, and mixtures thereof, with one-half to twenty overall weight percent of a member selected from the group consisting of zirconium diboride powder, titanium diboride powder, and mixture thereof, and subjecting said mixture to temperatures of 1300° C. to above 1800° C. at pressures of 50 kilobars to about 100 kilobars in the cubic-stable region of the cubic-hexagonal pressure-temperature phase diagram in an inert or reducing atmosphere.

2. The method of claim 1 wherein the overall weight proportion of diboride powder is about one percent.

3. The method of claim 1 wherein the diboride is titanium diboride.

References Cited
UNITED STATES PATENTS

| | | | |
|---|---|---|---|
| 2,872,327 | 2/1959 | Taylor | 51—307 |
| 3,142,595 | 7/1964 | Wentorf | 51—307 |
| 3,305,373 | 2/1967 | Murata | 51—307 |
| 3,212,852 | 10/1965 | Bundy | 51—307 |

DONALD J. ARNOLD, Primary Examiner

U.S. Cl. X.R.

51—293, 309; 423—446